Feb. 26, 1924.
C. L. BURDICK
1,484,870
COIN COUNTING AND PACKETING MACHINE
Filed June 21, 1920    7 Sheets-Sheet 1
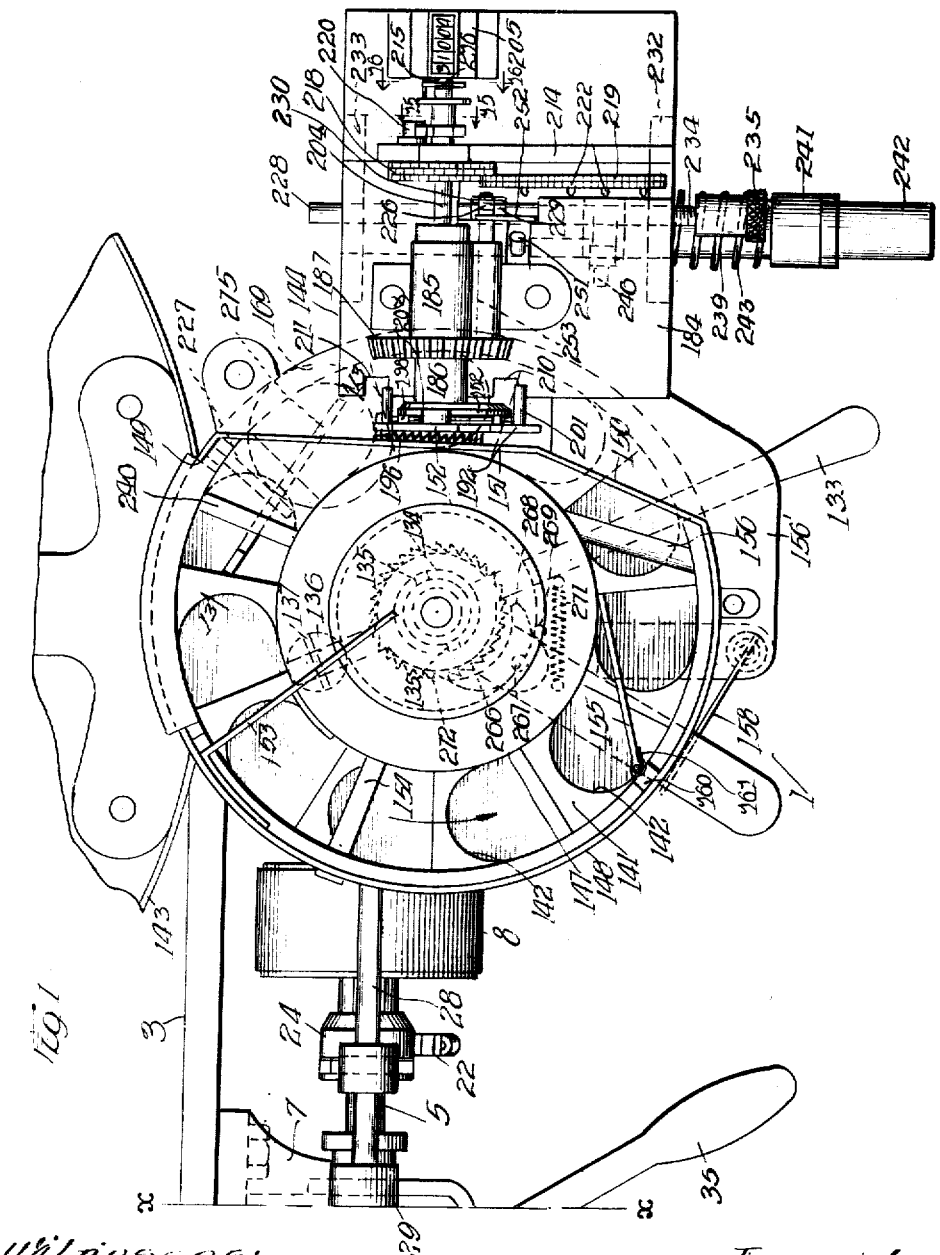
Witnesses:
Harry R. L. White
W. P. Kilroy
Inventor
Charles L. Burdick
Brown Boettcher Denney
By
Attys Feb. 26, 1924.
C. L. BURDICK
1,484,870
COIN COUNTING AND PACKETING MACHINE
Filed June 21, 1920    7 Sheets-Sheet 2
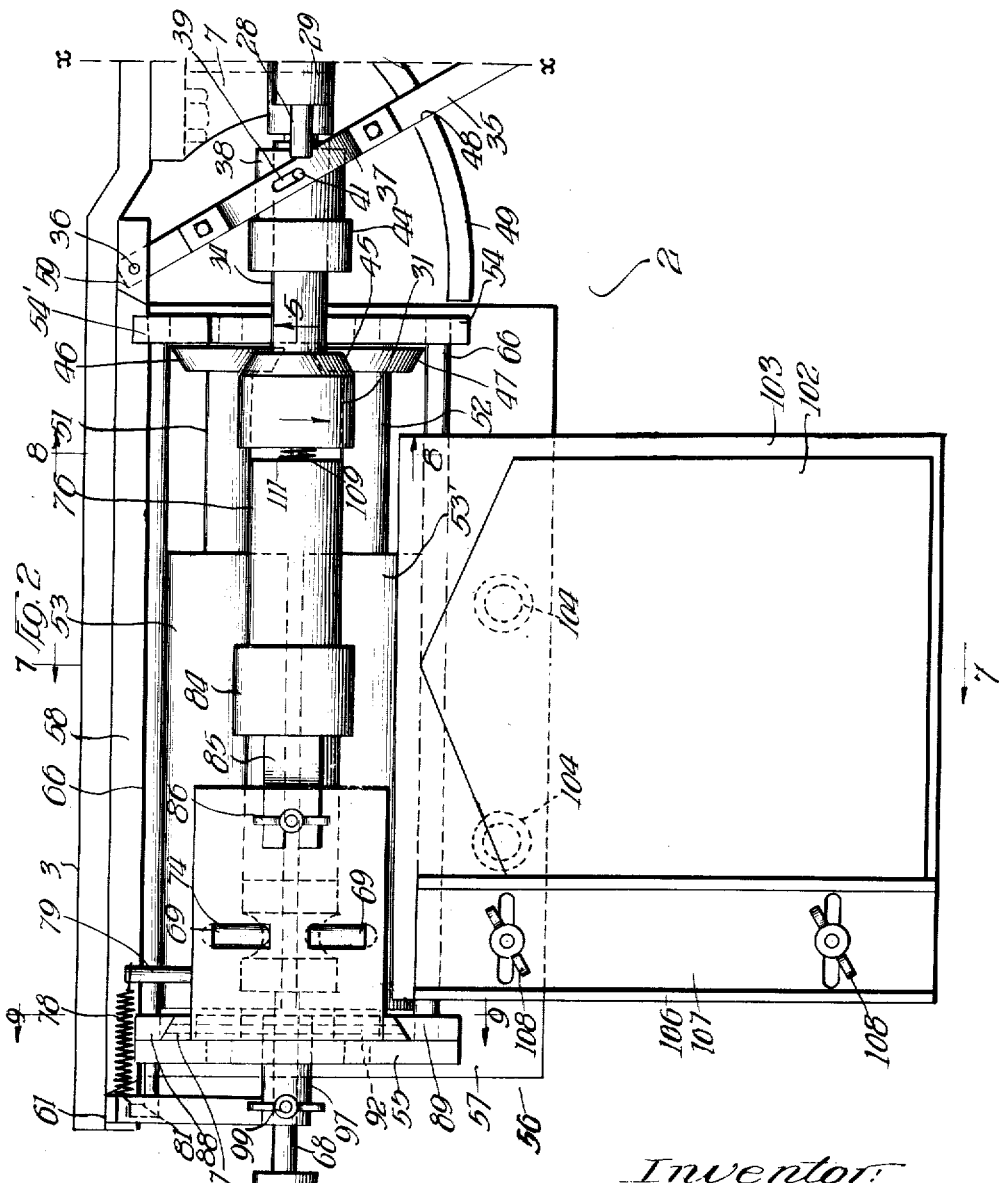

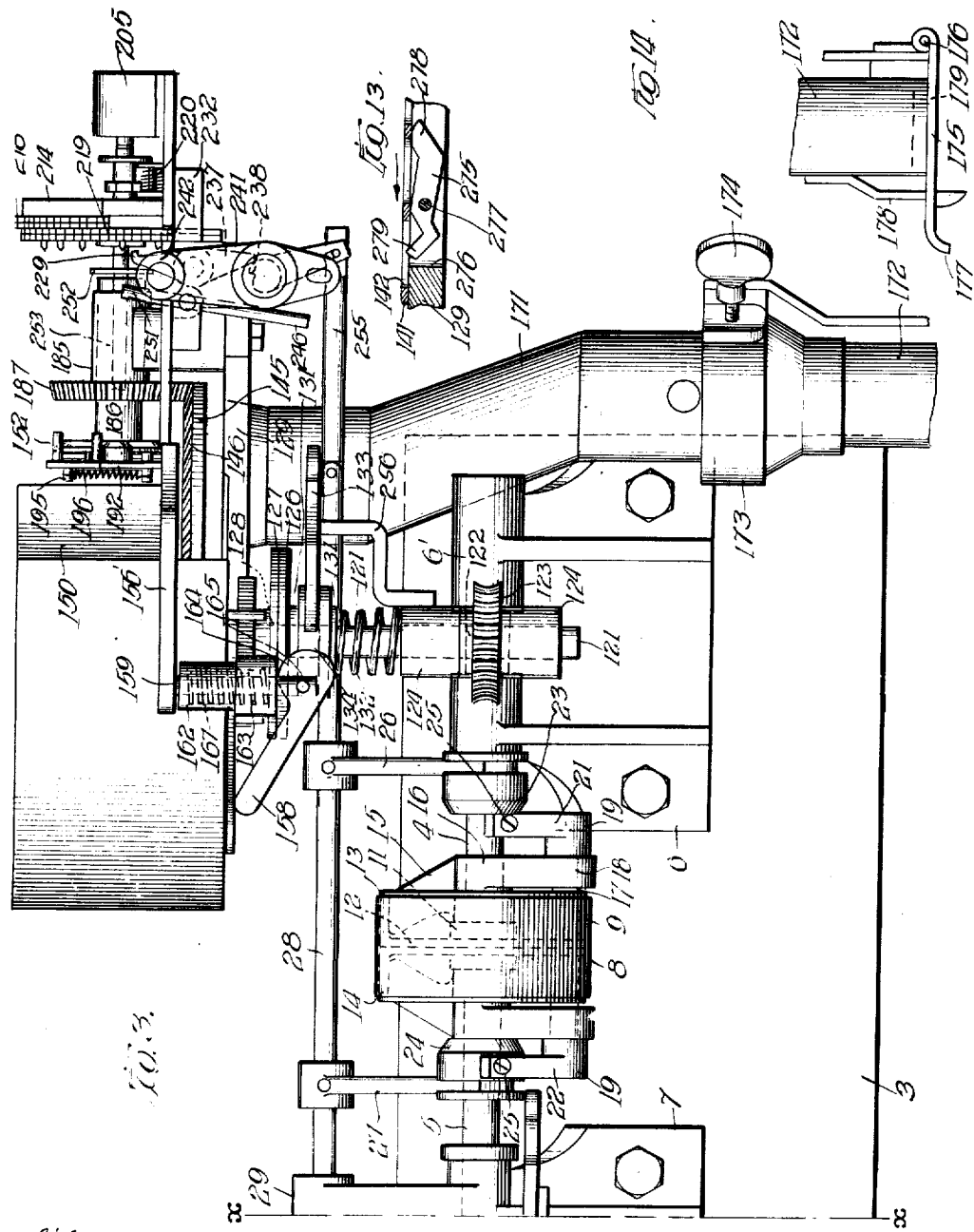

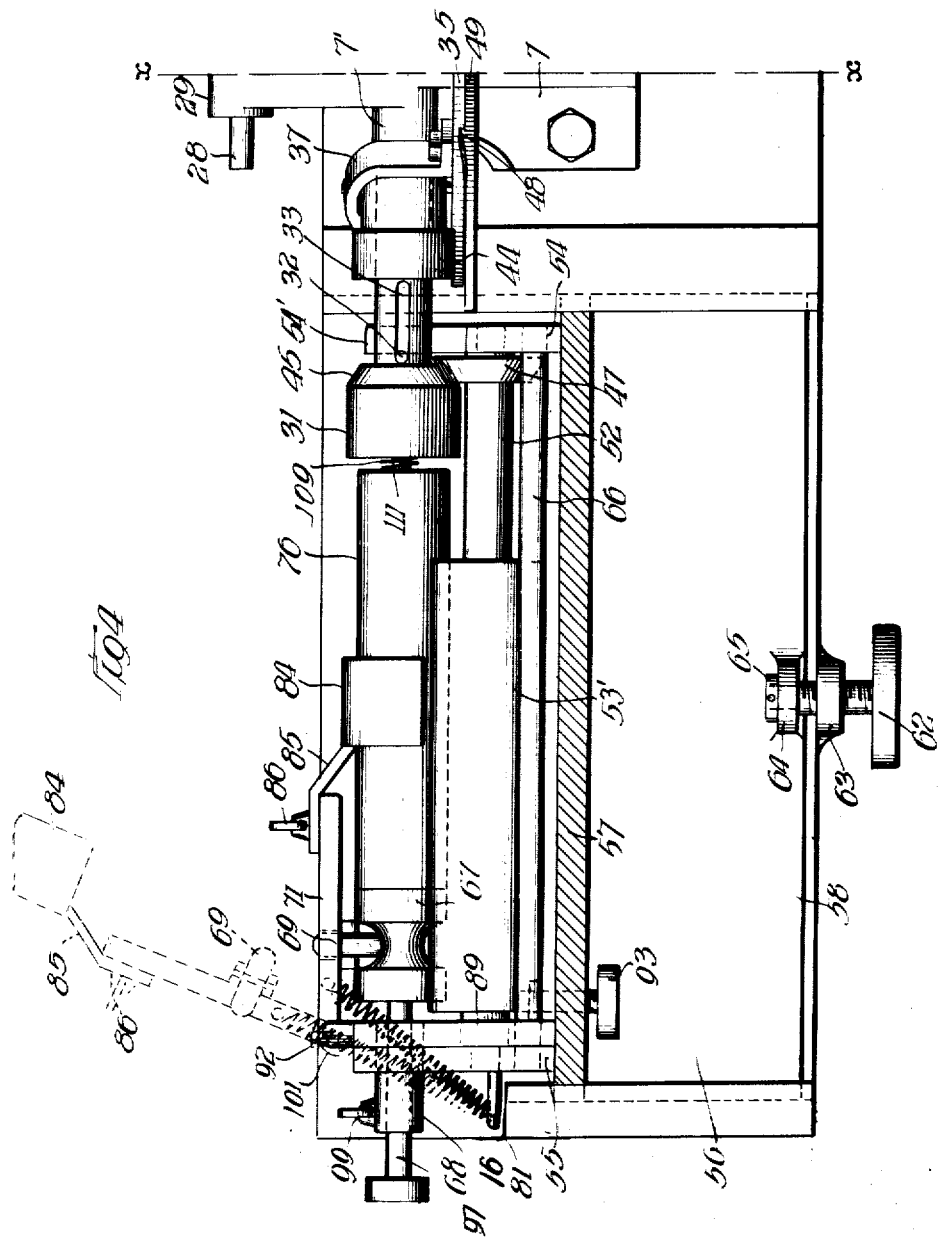

Feb. 26, 1924.
C. L. BURDICK
1,484,870
COIN COUNTING AND PACKETING MACHINE
Filed June 21, 1920     7 Sheets-Sheet 5
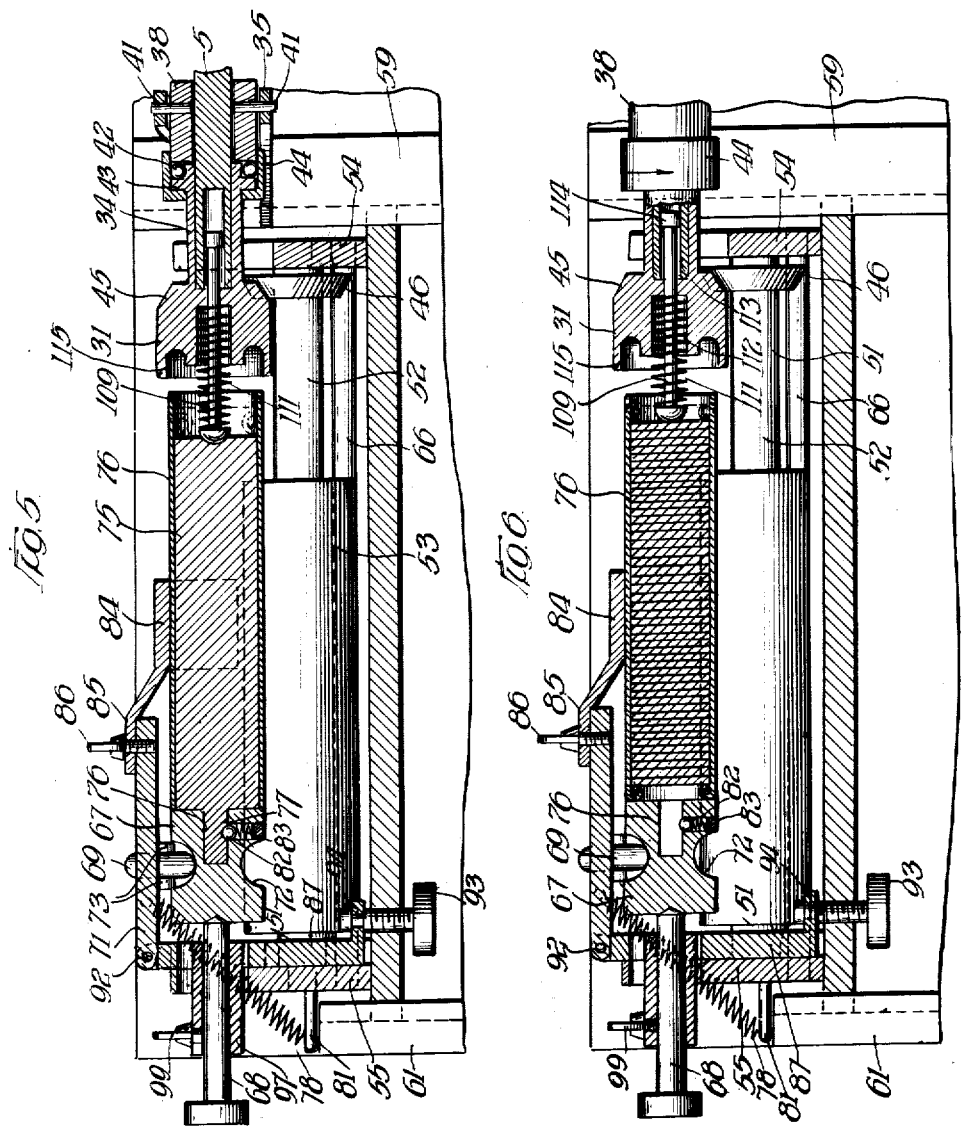

Feb. 26, 1924.
C. L. BURDICK
1,484,870
COIN COUNTING AND PACKETING MACHINE
Filed June 21, 1920    7 Sheets-Sheet 6
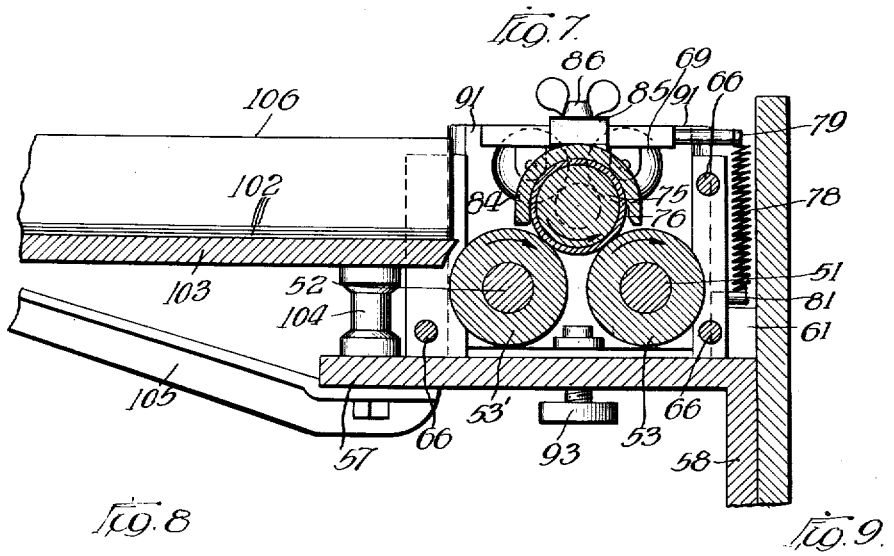
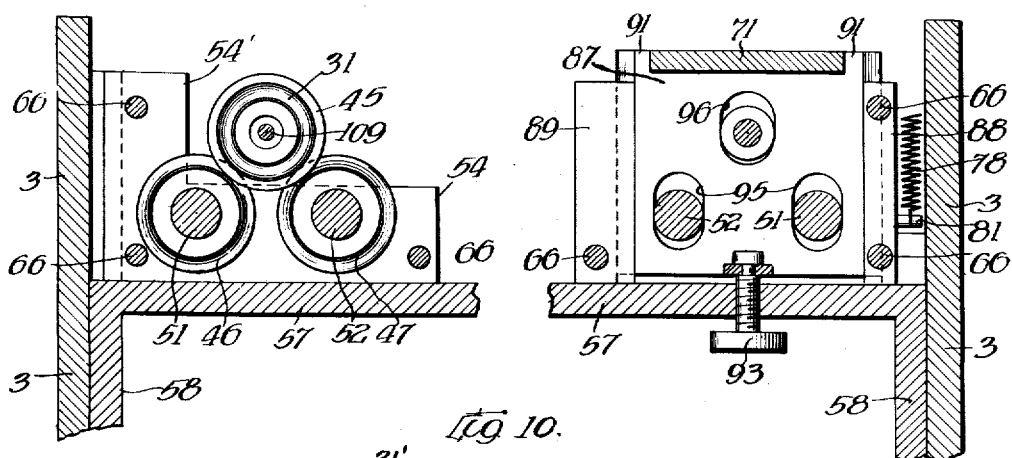
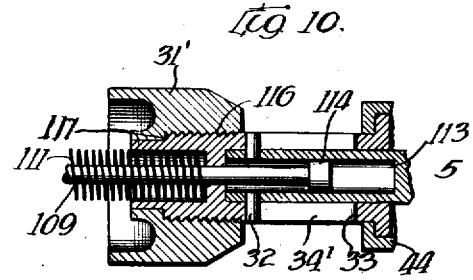
Witnesses:
Harry R. L. White.
W. P. Kilroy
Inventor:
Charles L. Burdick
Brown Boettcher & Dienner
By
Attys.

Feb. 26, 1924.
C. L. BURDICK
1,484,870
COIN COUNTING AND PACKETING MACHINE
Filed June 21, 1920
7 Sheets-Sheet. 7
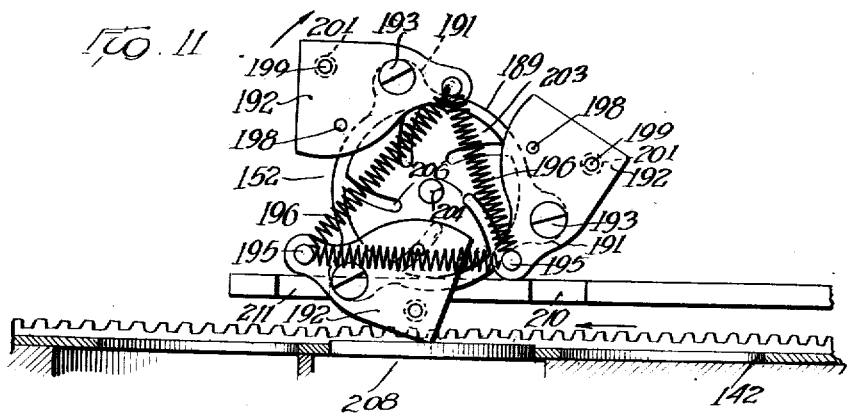
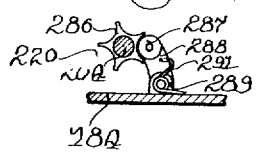
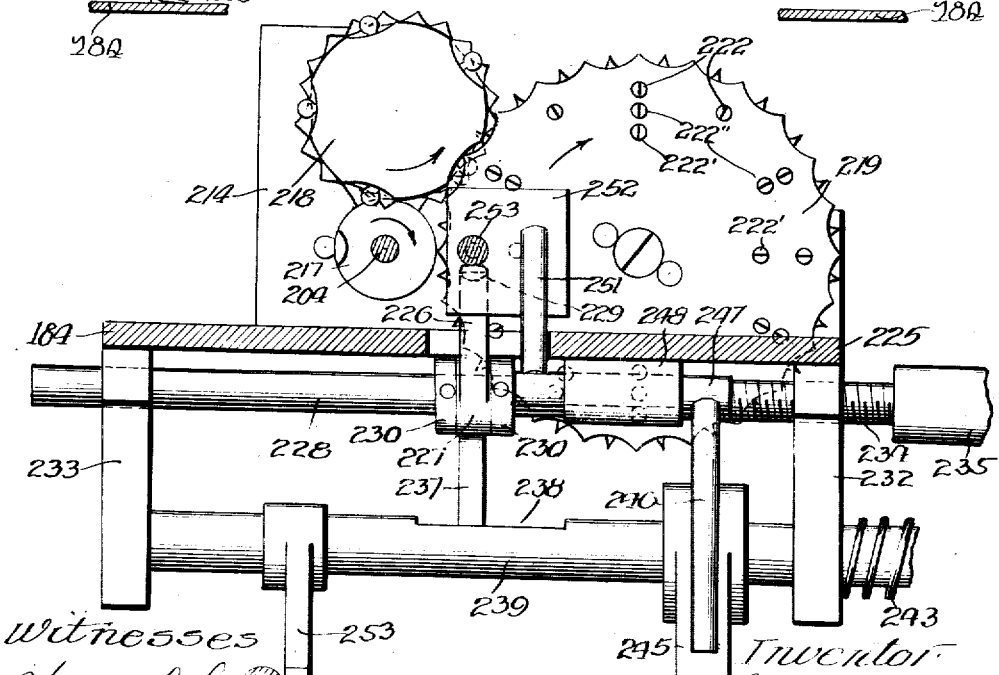

Patented Feb. 26, 1924.

1,484,870

UNITED STATES PATENT OFFICE.

CHARLES LAURENCE BURDICK, OF LONDON, ENGLAND.

COIN COUNTING AND PACKETING MACHINE.

Application filed June 21, 1920. Serial No. 390,597.

*To all whom it may concern:*

Be it known that I, CHARLES L. BURDICK, a citizen of the United States, residing at 4 Eastern Rd., Woodgreen, London, N., Middlesex County, England, have invented a certain new and useful Improvement in Coin Counting and Packeting Machines, of which the following is a full, clear, concise, and exact description, reference being had to the accompanying drawings, forming a part of this specification.

My invention relates to coin counting and packeting machines such as are used in banks, mints, traction railway terminals, and other industrial establishments where large quantities of coins are to be counted and packeted.

Considering the invention in its broadest aspect, the various functions of the machine are:

(1) To first form the packet or carton for receiving the coins;

(2) To then automatically fill these cartons with coins in predetermined quantities; and (3) To finally seal the cartons after they have been filled.

These several operations are performed in a carton forming and sealing mechanism and in a coin counting mechanism, both of which mechanisms have interrelated driving connection so as to automatically function at predetermined periods, in accordance with a predetermined cycle of operation of the machine.

One of the particular objects of the invention is to provide an improved construction of packeting mechanism which can be readily and conveniently adapted to perform in the one machine either the carton forming operation or the carton sealing operation.

Another object of the invention is to provide an improved construction of carton forming and sealing mechanism which can be adapted to the formation and sealing of different sized cartons for receiving different denominations of coins with maximum facility and convenience. These machines are frequently required to be operated by employees whose knowledge of such mechanisms is generally rudimentary, and it is therefore imperative that the various adjustments of the machine and its operation be of the utmost simplicity.

Another object of the invention is to provide improved tripping mechanism for positively tripping and arresting the operation of the coin counting mechanism after a predetermined number of coins have been discharged into a carton.

Another object is to provide improved count adjusting means for conveniently and simply adjusting the counting mechanism for varying the number of coins to be fed into each carton.

Another object is to provide an improved, adjustable system of brushing and shearing members for preventing the feeding of more than one coin at a time past the coin counting mechanism.

Another object is to provide improved means for positively interrupting the operative relation between the counting device and the registering mechanism after the count of each individual coin, so that there will be absolutely no possibility of "overthrow" and consequent false actuation of the registering and trip-out mechanisms.

Another object is to provide improved means for quickly reversing the direction of feed of the coin feeding element in order to quickly relieve any jamming of the coins in the feeding mechanism.

Another object is to provide an improved power transmission system for selectively driving either the carton forming and sealing mechanism or the coin counting mechanism; and a further object in this regard is to provide improved means for automatically interrupting the drive to one mechanism and transferring it to the other mechanism in accordance with the cycle of operation of the machine.

Another object is to provide coin packeting and counting mechanism which will operate to count and packet the coins with maximum rapidity, and at the same time with absolute accuracy of count.

A still further object of the invention is to devise a form of machine having the above general characteristics which will be comparatively simple in structure and inexpensive to manufacture. There have been numerous machines heretofore exploited for the counting, registering and packeting of coins, but for the greater portion these machines have not gained in commercial favor because of their initial cost, their complexity of operation, and their cost of maintenance for repairs and the like. These machines have generally been beyond the purchasing ability of small concerns which do not handle coins in sufficiently large quantities to warrant the expense of such an elaborate machine. The simplicity of structure and operation of the present construction of machine admirably adapts it to use in small, as well as in large industrial establishments.

The present form of machine is capable of other utilities than those specifically described, such as the counting of coins in indefinite quantities, or the counting and bagging of coins. In the appended detail description, wherein I have described a preferred embodiment of my invention, I have described the counting, registering and trip-out mechanisms as designed for the handling of United States currency; but if will of course be obvious that the numerical values herein referred to at which the trip-out mechanism is to be actuated may be modified in accordance with the species of currency handled.

In the drawings:

Figure 1 is a plan view of the right hand half of the machine;

Figure 2 is a similar view of the left hand half of the machine; the two views to be considered coextensive at the dash-and-dot-line x—x;

Figure 3 is a front elevational view of the coin counting mechanism illustrated in Figure 1;

Figure 4 is a similar view of the carton forming and sealing mechanism illustrated in Figure 2;

Figures 5 and 6 are vertical sectional views through the carton forming and sealing mechanism, the top view illustrating the operation of forming a carton and the latter view illustrating the operation of sealing a carton;

Figure 7 is a transverse sectional view through the carton forming and sealing mechanism taken on the plane of the line 7—7 of Figure 2;

Figure 8 is a similar view taken on the plane of the line 8—8 of Figure 2;

Figure 9 is a similar view taken on the plane of the line 9—9 of Figure 2;

Figure 10 is a detail sectional view of a modified construction of crimping head;

Figure 11 is an end elevational view of the counting head;

Figure 12 is a transverse sectional view through the shelf 184, illustrating the trip-out mechanism in elevation;

Figure 13 is a fragmentary sectional view taken on the line 13—13 of Figure 1;

Figure 14 is a fragmentary elevational view of the lower end of the carton receptacle.

Figure 15 is a detail section taken on the plane of the line 15—15 of Figure 1, and Figure 16 is a similar section taken on the plane of the line 16—16 of Figure 1.

Figure 1 illustrates the right hand portion of the machine, which includes the coin sorting and counting mechanism—designated 1 in its entirety. Figure 2 illustrates the left hand portion of the machine, which comprises the carton forming and sealing mechanism—designated 2 in its entirety. The machine has mounting support upon a rear vertical plate 3, which is adapted for independent mounting, or which constitutes part of a frame supporting structure. The counting and carton forming mechanisms 1 and 2 are arranged to be driven from independent drive shafts 4 and 5 (Figure 3) which are supported in alignment in bearing brackets 6 and 7. These bearing brackets are bolted to the rear mounting plate 3. The two shafts are driven from a pulley 8 having belt connection with any suitable source of power, this pulley having a dual system of clutches embodied therein for selectively transferring the driving connection from the pulley to either of the shafts 4 and 5. As shown in Figure 3, the pulley comprises a pulley rim 9 having a relatively narrow central hub 11, into which the ends of the shafts 4 and 5 extend for supporting the pulley. The web 12 of the pulley is constructed comparatively narrow, so as to afford maximum area of clutching surface around the interior of the rim 9 on either side of the web 12, for the clutching engagement of the expansible clutch bands 13 and 14. Each of these clutch bands has connection through a single radial spoke 15 with a hub 16 which is rigidly mounted on the end of the corresponding shaft. At a point diametrically opposite the spoke 15, each clutch band is split and formed at its ends with inwardly projecting lugs, which are bored for the reception of eccentric or elliptical pins or shafts 17 for expanding these bands into frictional clutching engagement with the pulley 8. Each shaft 17 is formed with an outer cylindrical portion for bearing support in an arm 18, which extends radially from the hub 16. A hub 19 is rigidly secured to the end of the shaft 17 outside of this bearing arm. Projecting from each of these hubs 19—19 are arms 21 and 22, which are adapted to co-operate with clutching cones 23 and 24 respectively on the shafts 4 and 5. In the ends of each of the arms 21 and 22 is mounted an adjustable screw 25, which is adapted for engagement with the tapered space of its respective clutching cone. These clutching cones are loosely mounted upon their respective shafts and are adapted to be slid axially along their shafts by depending forks 26 and 27 which are mounted on a clutch control rod 28. At its left hand end this rod is guided for reciprocating motion in a bearing 29, which extends up from the hub of the bearing bracket 7; and at its other end, the rod 28 has connection with the automatic tripping apparatus of the coin counting mechanism 1, which I shall hereinafter describe.

I shall first describe in detail the carton forming and sealing mechanism and then the coin counting mechanism, this being the more logical sequence of description, for the reason that the formation of the cartons or packets generally constitutes the first step in the operation of the machine; after which the finished cartons or packets are transferred to the coin counting machine for receiving their predetermined quantities of coins. The driving shaft 5 extends from the hub 7' of the bearing bracket 7 into operative association with the carton forming mechanism 2 where it supports a crimping or spinning head 31. This crimping head is driven from the shaft 5 through a pin and slot connection consisting of the pins 32—which project radially from the shaft end 5—and the slots 33 into which the pins extend. The slots 33 are formed in a sleeve 34 which carries the crimping head. This pin and slot connection permits of longitudinal motion of the crimping head on the end of the shaft 5, this longitudinal motion being effected by an operating lever 35 which is pivoted at its rear end to the mounting plate 3, as indicated at 36. The operating lever 35 is provided with a yoke member 37 which embraces a shifting collar 38, the yoke having operative connection therewith through slots 39 engaging over pins 41 projecting from the shifting collar 38. As shown in Figure 5, the shifting collar 38 and the sleeve 34 have rotatable thrust connection through a series of ball bearings 42, which are interposed between the end of the shifting collar 38 and a flange 43 on the sleeve 34. A flanged coupling connection 44 embraces the flange 43 and threads over the end of the shifting collar 38, thereby coupling the shifting collar and sleeve 34 together. It will be noticed that the rear edge of the crimping head 31 is shaped conically, as indicated at 45. This is for making frictional driving connection with two similarly coned wheels 46 and 47, which are mounted below and to each side of the spinning head 45. This beveled frictional surface on the crimping head is normally maintained in frictional engagement with the wheels 46 and 47 under a tension which is imposed by the operating lever 35. This frictional tension is obtained by engaging the operating lever 35 over a notch or step 48 in a quadrant 49, over which the operating lever 35 is adapted to be swung. The frictional driving wheels 46 and 47 are rigidly mounted upon two parallel horizontal shafts 51 and 52, which are spaced equidistantly to either side of the vertical axis of the shaft 5 and are a_ _ned in parallel relation thereto. These shafts support rolls 53 and 53', which are preferably composed of rubber or other similar material, and which function to assist in the forming and winding of the paper cartons, in a manner to be hereinafter described. The ends of the shafts 51 and 52 are formed with reduced journal extensions which have bearing support in transversely extending end frame members 54 and 55, which constitute part of an adjustable roll supporting frame—designated 56 in its entirety. As shown in Figure 2 and 4, this roll supporting frame comprises a horizontal table portion 57—on which are located the transverse end members 54 and 55—and also comprises a vertical guide plate 58, which is guided for vertical adjustment on the rear mounting plate 3. As will be noted from Figure 2, the vertical edges of the guide plate 58 are flared outwardly to have a dove-tail fit with the dove-tail guiding plates 59 and 61, which are fixedly secured to the rear mounting plate 3. The roll supporting frame 56 is adapted to be vertically adjusted as a unit by the manipulation of an adjusting screw 62, which threads through a lug 63, projecting forwardly from the rear mounting plate 3. Although I have shown the crimping head 31 as being shiftable towards the end of the carton, I also contemplate as an alternative arrangement the shifting of the carton towards the crimping head. This would be accomplished by arranging the roll supporting frame 56 to be shifted horizontally towards and away from the crimping head. Referring again to the adjusting screw 62, it will be noted that the upper end of the screw is reduced for extension through a lug 64, projecting from the vertical guide plate 58 of the frame. A collar 65 is pinned to the upper reduced end of the adjusting screw in order to draw the frame 56, downward with the adjusting motion of the screw. The two transverse end numbers 54 and 55 of the frame are reinforced by three horizontal bracing rods 66—66 (see Figures 8 and 9), the right hand frame number 54 having a vertical extension 54' for receiving the upper bracing rod 66. As will hereinafter appear, the vertical adjustment of the roll supporting frame 56 is for the purpose of adjusting the carton forming mechanism 2 for operation upon different sized cartons for containing different denominations of coins.

Rolling between the two forming rolls 53 and 53' is a mandrel head 67, which is backed up by a stem 68 having a pointed end engaging in a recess in the end of the mandrel head. The mandrel head 67 is held firmly depressed between the rolls 53—53', and is prevented from shifting longitudinally along these rolls, by two small rollers 69—69' which are pivotally supported in a superposed hinged plate 71. These rollers track in an annular groove 72 formed in the periphery of the mandrel head. The two rollers are spaced laterally from the center of the mandrel head 67, so as to engage in this groove 72 on each side of the head. The rollers are pivoted between pairs of depending lugs 73, the upper periphery of the rollers projecting up through slots 74 in the hinged plate 71. In the formation of the packets or cartons, the mandrel head 67 is adapted to receive a removable mandrel shank 75, which extends from the mandrel head to a point adjacent the crimping head 31. The mandrel 75 is removably mounted in the mandrel head 67 by providing the latter with a square or polygonal bore 76 in its front face, into which is adapted to be inserted a correspondingly formed pin 77 on the rear end of the mandrel 75. The mandrel 75 is smaller in diameter than the mandrel head 67, to an extent corresponding to the thickness of the finished carton 76, so that the outer surface of the carton 76 will be substantially flush with the periphery of the mandrel head 67 and will have rolling contact with the forming rolls 53—53'. The two guide rollers 69 are normally held depressed in the annular groove 72 under the tension of a spring 78, which is connected at one end to a laterally extending pin projecting from the side of the hinged plate 71, and at its other end is connected to a pin 81 which projects outwardly from the transverse frame member 55. By virtue of the resilient bearing of the rollers 69 in the groove 72, the mandrel head and shank are always free to rock up or down or to wabble slightly relative to the rolls 53—53', thereby accommodating any irregularities or slightly varying thicknesses in the cartons 76. The mandrel head 67 and the mandrel 75 may be releasably coupled together by a ball detent 82 which is set in a pocket in the mandrel head 67 and which is normally thrust into a recess or groove in the pin extension 77 under the pressure of a spring 83. The provision of this ball detent is not essential, however, as the mandrel head and shank are normally held together under the pressure of a spring plunger 109 at the other end of the mandrel. On the free end of the hinged plate 71 is releasably fastened a semi-circular guide 84, the sides of which embrace the mandrel shank 75 and extend down to a point adjacent the rubber rolls 53—53' (see Figure 7). The guide 84 is formed with an extension 85, the end of which is slotted for releasable clamping engagement under a wing nut 86 which screws down into the hinged plate 71. This hinged plate constitutes part of an adjustable sub-frame, which is adapted for adjustment relative to the roll supporting frame 56. This adjustable sub-frame comprises a vertical guide plate 87 which is guided for vertical adjusting motion on the front face of the transverse frame member 55. The sides of the plate 87 are beveled for reception between dove-tail guide plates 88 and 89, which are secured to the front surface of the frame member or wall 55. The top of the guide plate 87 is formed with upwardly projecting lugs 91—91 (Figures 2 and 7) between which the hinged plate 71 is pivoted upon a horizontal pivot pin 92 extending through the lugs. This subframe is adjustable relative to the roll supporting frame 56 by the provision of an adjusting screw 93, which threads up through the table extension 57 of the roll supporting frame and has rotatable connection in a lug 94 projecting laterally from the bottom of the guide plate 87. As will be noted from Figure 9, the guide plate 87 is provided with vertically elongated openings 95 to permit the extension of the shafts 51 and 52 into the transverse frame member 55 without interference with the adjustable plate 87. The guide plate 87 is also slotted as indicated at 96 to receive the end of the hub 97, which supports the stem 68. This hub has rigid mounting support in alignment with the crimping head 31 on a bracket extension 98 which is secured to the rear mounting plate 3. A wing nut 99 threads down through the hub 97 and serves to clamp the stem 68 in any of its longitudinally adjusted positions. The hinged plate 71 is adapted to be swung up out of cooperative engagement with the mandrel head and mandrel shank, into the position indicated in dotted lines in Figure 4, for facility in substituting mandrels or for inserting the filled coin cartons into operative position on the rolls 53—53'. The hinged plate is retained in its elevated position by the biasing action of the spring 78 which tends to bias the plate 71 over the center 92; a lug 101 on the plate 71 engaging the upper edge of the guide plate 87 and limiting the backward throw of the hinged plate.

The paper sheets 102 for forming the cartons are supported in feeding position on a table 103, which is supported at the outer edge of the horizontal portion 57 of the roll supporting frame 56. The feeding edge of table 103 terminates in close proximity to the rubber roll 53', being supported above the horizontal frame portion 57 upon short posts 104 and on an inclined mounting bracket 105. The left hand edge of the table 103 is provided with a vertical wall 106, along which extends a marginal clamp 107 for clamping the margins of the sheets 102. The marginal clamp 107 is releasably clamped down along the margins of the sheets 102 by wing nuts 108.

For the purpose of holding the coins erect in the coin cartons during the operation of sealing the ends of the cartons after the cartons have been filled, the crimping head 31 is provided with a spring plunger 109 which is normally thrust outward through the end of the crimping head under the tension of a spring 111. The spring 111 sets into a recess 112 in the front end of the crimping head, the plunger 109 being extended through the rear wall of the crimping head and into a bore 113 in the end of the shaft 5. The end of the plunger 109 is provided with a collar 114, which limits the outward motion of the plunger by engaging the rear wall of the crimping head 31. The crimping head is formed with a forwardly projecting flange having an internal diameter of just sufficient size to snugly receive the open end of the carton 76. The inner wall of this flange is rounded into the hub of the crimping head, so as to form a re-entrant curve 115 for turning the edge of the carton inwardly and back upon itself to form an inwardly rolled bead as indicated in dotted lines. This rolled bead forms a solid rim of paper at each end of the carton.

I shall first describe the method of forming cartons in the packeting mechanism just described, before proceeding to a detail description of the coin counting mechanism 1. Assume now that it is desired to form cartons for receiving nickels or five cent pieces, and that the mandrel head 67, mandrel shank 75 and crimping head 31 are of a size corresponding to this size of carton. Power is transmitted to the driving shaft 5 from the clutch pulley 8 through the proper actuation of the control rod 28 (in a manner to be hereinafter described); whereupon the crimping head 31 begins to rotate in the direction indicated by the arrow in Figure 2 and transmits power through its frictional driving surface 45 to the two frictional driving wheels 46 and 47—it being understood that the operating lever 35 is in its right hand position, against the shoulder 48. The frictional driving wheels 46 and 47 rotate the rubber rolls 53—53', which in turn rotate the mandrel head 67 and mandrel shank 75, each in the direction indicated in Figure 7. The uppermost sheet 102 is then fed forwardly between the rubber roll 53' and the mandrel shank 75, the marginal guide 107 serving to accurately guide the sheet into engagement with the mandrel shank, so that the left hand edge of the sheet will come up against the shoulder formed by the larger diameter of the mandrel head 67. When the leading edge of the sheet has been caught between the roll 53' and the mandrel shank 75, the sheet is carried around the bottom of the mandrel shank and in between the mandrel shank and the roll 53. The sheet is then deflected up and around the top of the mandrel shank by the guide 84, and down to the feeding point in contact with the entering portion of the sheet. The sheet continues winding around the mandrel until it is completely wound, each sheet being preferably just long enough to make substantially two or three complete layers around the mandrel. The sheets may be of different widths for forming cartons of different lengths for receiving different quantities of coins. As a result of the spring pressed bearing engagement of the mandrel on the forming rolls 53—53' the paper is always pressed firmly against the mandrel, so that a firm, tightly wound carton is produced.

After the entire sheet has been wound about the mandrel, the operating lever 35 is raised to clear the shoulder 48 and is swung to the left to shift the crimping head 31 into operative engagement with the end of the carton projecting beyond the end of the mandrel 75. Simultaneously with the shifting of the crimper head 31 over into crimping engagement with the end of the carton, the driving connection between the frictional driving face 45 on the crimper head and the frictional wheels 46 and 47 is interrupted, and consequently the rolls 53—53' and mandrel 75 immediately cease rotation. As a result, the crimping head engages with the end of the carton when the latter is stationary or substantially so, and consequently the high speed rotation of the crimper head readily turns the edge of the carton inwardly in the form of a crimped bead, as denoted by the dotted lines in Figure 5. If desired, any suitable stop means may be devised to limit the shifting motion of the crimper head so as to produce a uniform depth of crimper head in all of the cartons. The carton thus formed is then removed for transfer to the coin counting mechanism by raising the hinged plate 71 and lifting the mandrel 75 from between the rolls 53—53', whereupon the carton may be freely removed from one end of the mandrel. The mandrel is then replaced between the rolls and the hinged plate 71 is returned to operative position for the formation of another carton. The inwardly crimped end of the carton is adequate to hold the carton against unwinding after its removal from the mandrel, although an adhesive strip or other suitable means may be utilized in addition to the crimped end if desired.

Assume now that it is desired to wind cartons for receiving half dollars. The mandrel head 67 and mandrel 75 are first substituted by a larger mandrel head and larger mandrel corresponding to this size of coin. The roll supporting frame 56 is then lowered to bring the mandrel head and mandrel into axial alignment with the crimping head 31. A suitable scale may be arranged to indicate the height of the frame 56 in the value of the coins to be packeted. The sub-frame, consisting of the vertical guide plate 87 and the hinged plate 71, is then shifted upwardly by manipulation of the adjusting screw 93, to elevate the hinged plate 71, so that the guide roller 69 and guide 84 will properly engage with the larger mandrel head and mandrel. The semi-circular guide 84 is substituted by a guide of larger diameter, corresponding to the size of carton for receiving half dollars. The crimping head 31 is also substituted by a larger crimping head corresponding to this size of carton. The substitution can be readily effected by unscrewing the coupling nut 44 and removing the crimping head from the end of the shaft 5. According to this practice, each crimping head for the several sizes of coins would be provided with a standard coupling nut 44 for screwing onto the end of the shifting collar 38; and each crimping head would be provided with its individual spring plunger 109. In Figure 10, I have illustrated a modified construction of crimping head, which is more particularly adapted to the convenient removal and substitution of the heads. In this embodiment, the crimping head 31' is constructed separate from the sleeve 34', and is adapted to releasably engage over the end of the latter, such as by a screw threaded connection 116. In making a substitution in this construction of crimping head, the crimping head proper is simply unscrewed from the threaded end of the sleeve 34' and a larger or smaller head substituted for it, the entire series of heads having a standard thread for engaging over the end of the sleeve. The direction of lead of this thread is such that the crimping operation will retain the head firmly screwed up against a shoulder 117 on the sleeve 34'.

The underlying principle of operation and the more essential elements of the coin counting mechanism 1 are broadly disclosed in my prior Patent No. 1,066,180, the present construction of mechanism being concerned with improvements in structure and in novel additional features over the more basic disclosure in my prior patent. Referring to the details of this present construction, the coin counting mechanism is adapted to be driven by a vertical shaft 121, which is driven at a reduced speed from the horizontal drive shaft through a worm 122 and worm wheel 123. The bearing hub 6' which supports the horizontal drive shaft 4 is constructed comparatively long, and at its center is cut away to receive the worm 122, which is rigidly secured to the drive shaft 4. The worm wheel 123 is mounted upon the vertical drive shaft 121 between a pair of bearing hubs 124—124 which may be extended forwardly from the bearing bracket 6, or may be rigidly supported in any other suitable manner. The vertical drive shaft 121 is arranged to drive the counting mechanism through a friction slippage clutch consisting of two friction discs 126 and 127. The lower disc 126 is formed with a central hub which is splined on the upper end of the drive shaft 121 so that it will rotate with the shaft and still may be shifted along the same. The upper disc 127 is rigidly mounted on a short stub-shaft 128, which extends up through the horizontal supporting plate 129 of the coin counting mechanism and serves to rotate the coin carrier. The hub which extends from the bottom of the lower friction disc 126 is formed with two spaced collars 131. The friction discs are normally thrust into resilient frictional engagement by a compression spring 132 which is confined between the lower collar 131 and the bearing hub 124. The friction discs are adapted to be separated for the purpose of interrupting the drive to the counting mechanism by the depression of a clutch lever 133 which is formed with a collar 134 having inwardly projecting shifting pins 135, which engage in the groove between the collars 131—131. The lever 133 is extended back beyond the collar 134 and terminates in a bifurcated lug 136 in which the lever is pivoted on a pin 137. The forward end of the lever 133 extends out beyond the front of the machine, as shown in Figure 1, and it will be apparent that by the act of depressing this end of the lever the lower clutch disc 126 will be retracted from frictional driving engagement with the upper clutch disc 127. One or both of these clutch discs may be faced with a frictional surface such as leather or fiber.

The horizontal supporting plate 129 has mounting support on the rear mounting plate 3 or other part of the frame structure in any suitable manner. I contemplate a detachable mounting arrangement for this supporting plate in order that larger or smaller coin counting mechanisms may be substituted, as for receiving coins of a different species or of a different range of sizes. The supporting plate 129 is of generally circular formation, and rotating above the upper surface of this plate is a coin feeding disc 141, which is driven from the stub shaft 128. This feeding disc is formed with a plurality of circumferentially arranged coin pockets 142 which are adapted to receive the coins from a coin tray 143 and convey them around to the counting mechanism 144, in the direction indicated by the arrow. These coin pockets consist of holes of semi-circular form which extend entirely through the disc 141, the leading edge of each pocket or hole being cut on a radial line. The coin conveying disc in which these pockets are formed is slightly thinner than the thinnest coin to be handled by the machine. For example, if the machine is designed to handle coins as small as dimes, the coin conveying disc 141 is constructed with a sectional thickness slightly thinner than that of a dime. The peripheral edge of the disc 141 is formed with an upwardly extending flange 145, on the upper edge of which is formed bevel gear teeth 146. This flange 145 restrains the coins against displacement outwardly over the edge of the disc as the coins are fed onto the same. Such coins as are not confined in the pockets 142 are free to move across the upper surface of the disc 141, this upper surface being preferably coned upwardly at the center to a slight degree, whereby the coins tend to move outwardly towards the path of the pockets 142 under the action of gravity and the centrifugal force created by the rotation of the disc. The coin conveying disc 141 is enclosed around the outside by a circular wall 148, which, as shown in Figures 1 and 3, extends down around the outside of the bevel gear 146 from the coin tray 143 to a point adjacent the counting mechanism 144. This circular wall is cut away at 149 to provide an opening for the feeding of coins from the coin tray 143 into the pockets 142 of the coin conveying disc. To permit the disposal of the coin counting head 152 directly over the coin pockets 142, the wall 148 is bent inwardly, as indicated at 150 and 151 (Figure 1), so as to clear the rotating coin counting head. It is important that but one coin pass this counting head 152 at a time, and in order to insure that this will always be the case, there are provided a plurality of brushes 153, 154, and 155, which are attached to the semi-circular wall 148 so as to extend inwardly over the top of the coin conveying disc 141. One or all of these brushes may be spring actuated so that they will yield in the case of the coins bunching or becoming jammed. The brush 155 is the last brush which the coins encounter, and this brush is pivoted to swing horizontally about a pivot lug 160, which projects inwardly from the side wall 148. The brush is normally held in the position illustrated by a tension spring 161, this spring permitting the brush to yield, however, if the coins tend to jam at this point. These brushes extend down into close proximity to the top of the disc 141 in order that they may function to force the coins into the coin pockets 142 and at the same time wipe superfluous coins off of the top of the pockets so as to always insure that there will be no more than one coin in each pocket. This brush 155 tends to wipe the superfluous coins from the top of the pockets onto the central coned portion of the disc 141, where they are carried around and back to the first brush 153. It will be noted that this brush extends inwardly at an angle toward the center of the disc, and as a result of this disposal of the brush the coins which are carried back into contact therewith are guided outwardly into the path of the pockets 142. As a final precaution against miscount, a shear plate 156 is provided just in front of the coin counting mechanism to positively remove any superfluous coins from the pockets or from the top of the disc. The edge of this shear plate, which is beveled to be of sharp formation, is extended obliquely across the coin passageway to facilitate the picking up of the superfluous coins; which, upon rising up over the shear plate 156, encounter the wall 150 which acts as a barrier to further passage of the coins. In order to readily adapt the counting mechanism to receive coins of different denominations having different thicknesses, I have provided adjusting mechanism for simultaneously raising or lowering the shear plate 156 together with the three brushes 153—154—155. As shown in Figures 1 and 3, the shear plate 156 is formed with a continuation which extends out under the diagonal wall 150 and around to the front of the machine, as indicated at 156'. This plate extension 156' is arranged to support the semi-circular casing wall 148, so that raising and lowering of this plate extension will function to simultaneously raise and lower the shear plate 156 and the group of brushes 153—154—155. The raising and lowering of this plate extension is effected through an eccentric lever 158 at the front of the machine. A vertical pin 159 extends downwardly from the bottom of the plate extension 156' and through a pair of telescoping tubes 162 and 163. The lower end of the pin 159 is extended through the bottom of the lower tube 163 and is bifurcated for the reception of an eccentric disc 164 on the end of the adjusting lever 158, this eccentric disc being pivoted in the bifurcated end of the pin on a pivot 165. The upper telescoping tube 162 is secured to the plate extension 156', so as to move therewith, and the lower telescoping tube 163 is suitably supported in stationary position relative thereto. A coiled spring 167, which is confined within these telescoping tubes, tends to raise the plate extension 156'. This is counteracted by the engagement of the eccentric disc 164 with the bottom of the stationary tube 163, and it will thus be apparent that by the rotation of the adjusting lever 158 the plate extension 156' may be raised or lowered to any desired point to properly position the brushes and shearing plate for receiving different denominations of coins. Any suitable scale means may be arranged to cooperate with the adjusting lever 158 to indicate the denomination of coins for which the brushes and shearing plate are set, as for example indicia marked off on the eccentric disc 164.

After the coins have been carried past the counting head 152, and have actuated the counting mechanism (in a manner which I shall hereinafter describe), they are discharged through an opening 169 in the supporting plate 129, into a coin chute 171 which extends downwardly from the supporting plate 129. This coin chute supports at its lower end a coin carton receptacle 172, into which the newly formed cartons are inserted after they have been wound and crimped as described in the preceding part of the specification. There are preferably a plurality of these receptacles 172 of different sizes, one size for each individual size of carton for the different denominations of coins. Each of these receptacles is provided at its upper end with a standard size of flared collar or mouthpiece 173, which is clamped over the lower end of the coin chute 171 by a thumb screw 174. The lower end of each receptacle 172 is provided with a hinged bottom 175 which is pivoted on a pin 176 at one side of the tube. The hinged bottom 175 is formed with a projecting thumb piece 177, which is adapted to hold the bottom in raised position by engaging with a spring detent 178 on the side of the tube 172. The carton is adapted to be inserted into the receptacle with its crimped end at the bottom, and the hinged bottom 175 is formed on its upper surface with a circular anvil or raised portion 179, which is adapted to project up within the crimped end of the carton to deflect the first coin into a flatwise position in the carton.

The carton receptacle 172 may be constructed with its inside diameter slightly larger than the outside of the carton to allow the free end of the carton to spread out slightly by its own resiliency and closely engage with the inner wall of the receptacle in order to permit free passage of the coins down into the carton.

Referring now to the detail construction of the counting mechanism, and with particular reference to Figures 1, 3 and 11, it will be observed that the entire counting mechanism is supported on a horizontally extending shelf 184, which is rigidly supported on the horizontal supporting plate 129. Mounted on this shelf is a bearing 185 in which is journaled a sleeve 186 which carries the rotating counting head 152. This sleeve has mounted thereon a bevel gear 187 which extends down through a slot 188 in the shelf 184, and meshes with the bevel gear 146 which is formed around the periphery of the coin conveying disc 141. It will thus be obvious that the rotation of the coin conveying disc will rotate the gear 187 and sleeve 186 at substantially the same peripheral velocity as that of the coin pockets 142. At its outer end the sleeve 186 carries a disc 189 on which are formed three projecting ears 191. On these ears are pivoted three coin testing members 192, upon pivot screws 193 which extend through the coin testing members and into the ears 191. These coin testing members are formed with reduced inner ends 192' in which are mounted pins or studs 195. A system of three tension springs 196 interconnects these studs for the purpose of normally retaining the testing members swung outward in the position illustrated by the two uppermost testing members. The studs or pins 195 are extended through the backs of the coin testing members to engage the periphery of the disc 189 and limit the outward throw of the coin testing members. The outer end of each testing member is formed with a relatively wide flat edge, the outermost corner of which functions as a coin testing or detecting finger for detecting the presence of coins in the coin pockets 142. These outer ends carry small pins 198, which project a short distance from the rear of the testing members and which function to advance the coin totalizer, as I shall presently describe. Each testing member is also provided with a small pin or stud 199 adjacent its outermost testing corner, which pin projects a short distance from the rear of the testing member and pivotally supports a knock-out roller 201. The three coin testing members are spaced forwardly of the disc 189, by the interposition of washers between the testing members and the disc 189 or in any other suitable manner, and interposed in the intervening space between the testing members and the disc is a totalizer advancing disc 203. This latter disc is rigidly mounted on a shaft 204, which is extended back through the sleeve 186 and has operative connection with a totalizing register 205 which is mounted at the outer edge of the shelf 184. The advancing disc 203 is formed with a plurality of inwardly extending slots 206, which are curved slightly and are arranged to extend non-radially from the outer circumference of the disc. These slots are designed to co-operate with the advancing pins 198 which project from the rear of the coin testing members, these advancing pins being adapted to be thrust into the slots 206 when their respective coin testing members encounter coins in the pockets 142. Upon one of the coin testing members 192 encountering a coin in one of the pockets 142, as illustrated of the lower testing member, the corresponding advancing pin 198 is thrown up into one of the slots 206 adjacent the bottom of the disc, and the advancing disc is carried around with the motion of the coin testing member until the advancing pin is withdrawn from the slot by the action of the coin testing member in riding off the coin.

There are preferably five of such advancing slots 206, the advancement of each slot under the actuation of the coin testing member being through one fifth of a complete revolution. The number of these slots may of course be varied, as may also the number of coin testing members 192. The plane of rotation of these coin testing members intersects the plane of the coin pockets passing thereunder at substantially the center of such pockets; and formed in the supporting plate 129 in this plane of rotation is a slot 208 through which the coin testing members are adapted to revolve when there are no coins in the coin pockets 142. This slot is made comparatively narrow so that there will be no possibility of a coin becoming jammed in the same. When a coin testing member 192 revolves down into a coin pocket in which there is no coin the testing member merely revolves through the slot 208 concurrently with the motion of the coin pocket, and no advancing actuation is imparted to the disc 203.

To prevent any possibility of false actuation of the counting mechanism as a result of the coin testing members 192 tending to remain with their pins 198 in the slots 206 after the testing members have moved out of engagement with the coins, I have provided slots 210 and 211 in the adjacent edge of the shelf 184 for co-operation with the knock-out rollers 201. When the coin testing members 192 are in their normal outer positions, the knock-out rollers 201 may pass freely through the slots 210 and 211. If, however, after a coin testing member 192 has been thrown into advancing engagement with the disc 203, the testing member should fail to throw itself out of such advancing connection upon disengagement with the coin, the knock-out rollers 201 will fail to pass through the slot 211, but will strike the bottom of the shelf 184 and forcibly throw the coin testing member out of engagement with the advancing disc 203. Simultaneously with the releasing of the coin testing member in this fashion the knock-out roller 201 is swung outwardly into position where it may pass freely through the slot 211, so that there is no jamming or stopping of the machine as a result of this action.

The advancing shaft 204 extends through a transverse bearing plate 214, in which the shaft has bearing support, and at its outer end the shaft has releasable connection with the register shaft 215, through a self-aligning coupling 216. As shown best in Figures 1 and 16, this self-aligning coupling comprises a disc 281 on the advancing shaft 204 and a co-operating disc 282 on the Veeder shaft 215. The disc 292 carries a laterally extending pin 283 which plays in a radial slot 284 in the disc 281. This arrangement of coupling prevents any tendency of the shafts to bind if the bearings are slightly out of alignment. It also permits of the ready uncoupling of the Veeder counter. A suitable spring detent mechanism 220 (Figure 15) is preferably arranged to engage with the shaft 204 to retard the rotation of the shaft and prevent any overthrow thereof, as might result from its own inertia. As shown in Figure 15, this detent mechanism comprises a five point star wheel 286, mounted on the advancing shaft 204, and a co-operating detent roller 287, which is adapted to engage in the recesses in the star wheel. This roller is mounted on the end of a pivoted arm 288 which is pivoted to a lug 289 on the shelf 184 and which is normally urged towards the star wheel 286 by a tension spring 291. Mounted on the shaft 204 adjacent the bearing plate 214 is a one tooth Geneva gear 217 (Figure 12). This one tooth Geneva gear meshes with a five tooth Geneva gear 218, which has bearing support in the bearing plate 214 directly above the Geneva gear 217. This five tooth Geneva gear meshes with a large Geneva gear wheel 219, which is also pivoted in the vertical bearing plate 214. As remarked in the description of the advancing disc 203, the shaft 204 makes one complete revolution for every five coins counted. Also the one tooth Geneva gear 217 is required to make five complete revolutions to revolve the five tooth Geneva gear 218 through one revolution, and it will therefore be apparent that the five tooth Geneva gear 218 will make one complete revolution for every 25 coins counted. The Geneva gear 218 may be arranged to advance the large Geneva gear wheel 219 at any preferred rate, depending upon the range of numerical selection which it is desired to have in counting the number of coins to be fed into each carton. I shall not refer in detail to the specific interlocking relation of the teeth on these Geneva gears, it being common knowledge to those skilled in the art how each successive gear of the train is interlocked to the next preceding gear.

Projecting from the face of the large Geneva gear wheel 219 is a series of tripping pins 222, which are angularly spaced in predetermined relation in accordance with the selected numerical values of the coins to be fed into the cartons. The large Geneva gear wheel 219 extends down through a specially configured slot 225, which is cut transversely in the shelf 184; and extending up through this slot is a trip-out lever 226, which the tripping pins 222 are adapted to engage as the gear wheel 219 is progressively advanced. This trip-out lever extends up from a hub 227, which is rotatably supported on a shaft 228 extending horizontally beneath the shelf 184. The hub 227 is rotatably supported on the shaft 228 between a pair of collars 230—230 which are pinned to the shaft to laterally shift the hub 227 with the longitudinal motion of the shaft. The end of the trip-out lever 226 is formed with a projecting lug 229 which is adapted to be engaged by the trip-out pins 222. The rotation of the gear wheel 219 is such that the pins come up under the projecting lug 229, and to facilitate the trip-out action this lug is beveled on its under side to co-operate with the beveled surfaces on the pins 222. The shaft 228 is supported in depending brackets 232 and 233, one at each edge of the shelf 184. The forward end of the shaft 228 is formed with a lead screw 234 which screws into a threaded bore in the front bearing bracket 232. A knurled knob 235 is secured to the end of the shaft 228, and by the manipulation of this knob the shaft 228 may be shifted back and forth so as to adjustably position the trip-out lever 226 at any desired radius of the gear wheel 219. Depending from the hub 227 of the trip-out lever is a second lever arm 237, the lower end of which is formed with an abrupt shoulder which is adapted to engage in a shouldered notch 238 in a shaft 239. The shaft 239 is journaled in the brackets 232 and 233 below the shaft 228, and carries at its forward end an operating crank 241 having an operating handle 242. A tension spring 243, which is confined between the hub of the operating crank 241 and the bearing bracket 232, has its ends secured to this hub and this bracket so that it will normally tend to oscillate the operating crank 241 in a counterclockwise direction (Figure 3). This oscillation of the shaft 239 is normally prevented by the engagement of the lever 239 in the notch 238, this lever normally tending to swing into the notch under gravity, or being provided with a suitable spring tending to swing it into the notch 238. This notch 238 is made comparatively long so as to permit the horizontal adjusting movement of the trip-out lever 226 across the face of the gear wheel 219. Mounted on the lower shaft 239 between the brackets 232 and 233 is a downwardly projecting lever 245, which is adapted to engage and rock an arm 246 when the operating crank 241 is revolved in a clockwise direction. The upper end of the arm 246 is carried in a transverse shaft 247, which is journaled in a bracket 248 depending from the bottom of the shelf 184. The other end of the transverse shaft 247 extends out beyond the bearing bracket 248 and carries an upwardly extending arm 251. This latter arm lies immediately in front of a plate 252 which is rigidly carried on the end of locking pin 253, which reciprocates in an enlargement formed on the side of the bearing bracket 185. The other end of this locking pin 253 is adapted for locking reception in a series of holes formed about the beveled gear 187. The plate 252 lies immediately in front of the trip-out lever 226, and is made sufficiently wide to have operative engagement with the lever in any of its various positions of adjustment across the face of the gear wheel 219. Another arm 253 extends downwardly from the lower shaft 239, adjacent the rear end thereof, and is slotted at its lower end to receive a pin 254 in the end of a horizontal link 255. The link 255 is pivotally connected to the end of the clutch control rod 28, this end of the clutch control rod being guided in an angular bracket 256 which is secured to the bearing hub 124.

Referring again to the tripping pins 222 on the large Geneva gear wheel 219, it will be observed that these pins are grouped into a plurality of different series, each having a different radial spacing from the center of the wheel 219. In the arrangement illustrated, there are three of such series of pins, namely; an outer series 222, an inner series 222', and an intermediate series 222". These different pins are preferably removably mounted in the wheel 219 in order that they may be removed or that their angular spacing may be changed. One of these series of pins may be arranged with a minimum angular spacing between pins to correspond to a predetermined minimum number of coins to be packeted, and the other series of pins may be angularly spaced in even multiples of this minimum number, or in other combinations of the same. For example, if the spacing between the pins 222 represented 25 coins, the spacing between the pins 222" would represent 50 coins, and the spacing between the pins 222' would represent 75 coins. These angular spacings are merely exemplary, of course, and may be varied to adapt the machine to the handling of different currency and widely different denominations of coins.

Assume now that a completed carton has been inserted in the carton receptacle 172, and assume also that the adjusting knob 235 has been adjusted to place the trip-out lever 226 in line with the outermost series of pins 222. (A scale or indicator may be arranged to indicate the radial position of the tripping lever in the numerical quotas of the coins to be packeted.) The operating crank 241 is then thrown to the right (Figure 3) to shift the clutch control rod 28 and clutch the driving pulley 8 to the counting mechanism and also to set the arm 237 of the trip-out lever in the notch 238 in the operating shaft. As the coins pass under the counting head 152, they progressively advance the totalizer shaft 204, thereby advancing the numerical total on the register 205 and progressively advancing the Geneva gear 218. This Geneva gear in turn advances the large gear wheel 219, and as soon as a predetermined number of coins have been discharged into the coin chute 171, one of the pins 222 engages with the projecting lug 229 on the trip-out lever 226 and trips the latter by rocking the arm 237 out of the notch 238. Simultaneously with the release of the arm 237 from the notch 238, the trip-out lever 226 strikes the plate 252 and thrusts the locking rod 253 into one of the holes in the beveled gear 187, instantly stopping the counting mechanism and preventing the further discharge of coins into the coin chute 171. Upon release of the arm 237 from the notch 238, the shaft 239 is instantly revolved in a counterclockwise direction under the action of the spring 243, and consequently, the clutch control rod 28 is shifted to clutch the driving pulley 8 to the carton forming mechanism. The stopping of the counting mechanism and the shifting of the clutch drive occur practically simultaneously, but even if there should be a momentary delay in shifting the clutch drive, the slippage clutch connection afforded by the friction discs 126 and 127 functions to relieve the drive to the counting mechanism so that no jamming will occur. The filled carton is then removed from the receptacle 172 by releasing the hinged bottom 175, and the carton is then transferred to the forming mechanism 2, where it is placed on the rolls 53—53', in place of the mandrel 75 which has been previously removed. This relation is illustrated in Figure 6, from which it will be noted that the mandrel head 76 is left in position to function as a backing support for the filled carton during the crimping operation. The crimping head 31 is then shifted over into crimping engagement with the open end of the carton by the actuation of the operating lever 35, as has been hereinbefore described in connection with the carton forming operation. The shifting of the crimping head 31 interrupts the driving connection to the rolls 53—53' and consequently the crimping head is brought into engagement with the end of the carton with the latter stationary or substantially so. The end of the carton is spun inwardly into engagement with the end coin under the action of the crimping head, the coins being maintained upright in the carton under the action of the spring plunger 109. This completes the operation of sealing the carton.

An empty carton is then inserted in the carton receptacle 172 and the operating crank 241 is revolved to the right. This transfers the power drive to the counting mechanism by actuating the clutch control rod 28, and also releases the locking pin 253 from the beveled gear 187 by rocking the arm 246 to the left and retracting the locking pin 253 from the locking hole in the gear 187. The counting operation then proceeds as previously described. If it should be desired to count an indefinite number of coins without interruption, the tripping lever 226 is shifted to a non-operative radius of the gear wheel 219—such as the innermost radius—and the coins are then run through the machine until the required number has been rung up on the totalizing register 215. For bagging coins the coin bags may be secured over the end of the coin chute 171 in any suitable manner.

In order to quickly relieve any jam which might occur in the coin counting mechanism, I have provided a reversing lever 264 for reversing the direction of motion of the coin feeding disc 141. The inner end of this reversing lever is formed with a hub which has pivotal support concentric with the stub-shaft 128, which drives the coin conveying disc 141. This lever carries a pawl 266 adapted to engage in a ratchet 272, which is rigidly mounted on the stub-shaft 128. The pawl 266 is pivoted to the lever on a pivot pin 267 and has a small tail piece 268 which is adapted to engage a stop pin 269. A tension spring 271 normally retains the lever 264 against the stop pin 269, and in this position of the lever, the pawl 266 is prevented from entering the ratchet teeth 272 by the engagement of the tail piece 268 with the stop pin 269. Upon swinging the lever 264 to the left, however, the pawl 266 is free to enter the ratchet teeth; which it does under the action of a small spring (not shown); and succeeding motion of the lever 264 revolves the coin conveying disc 141 backwards to release the jammed coins. During this reverse motion of the coin feeding mechanism, the driving connection thereto is preferably interrupted by depressing the lever 133, which releases the slippage clutch 126—127. To prevent any possibility of coins being fed backward in the coin feeding disc and discharged into the chute 171 when the coin feeding mechanism is being rotated reversely, I have provided a small ejecting lever 275 between the coin feeding tray 143 and the coin chute 171 (Figure 1). As shown in Figure 13, this ejecting lever is pivoted on a pin 277 in a narrow slot 276 in the stationary supporting plate 129. This ejecting lever is formed at one end with an ejector finger 279, which normally tends to swing up into the coin pockets 142 under the action of the weighted end 278 of the lever. When the coin feeding disc 141 is moving in its normal direction of travel over the ejector lever, as indicated by the arrow, the coin pockets 142 merely thrust the ejector finger 279 downward and ride freely over the same, the pockets being empty at this time. Upon any of such pockets tending to carry a coin backwards, however, during reverse rotation of the coin feeding disc, the coin ejecting finger 279 will automatically swing up into the coin pocket and displace the coin therein. Consequently, no coins are able to reach the coin chute 171 in this backward rotation of the coin feeding disc. A shear plate 240 (Figure 1) may be arranged to cooperate with the ejector lever 275.

It will be apparent that my invention is capable of various modifications and rearrangements and I intend that such modifications and rearrangements shall be included within the spirit and scope of the appended claims.

I claim:

1. In a machine of the class described, the combination of carton forming and sealing mechanism, coin counting mechanism, power means for driving both of said mechanisms, said mechanisms being adapted to function under manual control in predetermined sequence for forming, filling and sealing the cartons, and means for automatically transferring the power drive from one of said mechanisms to the other at one point in the cycle of operation of said machine.

2. In a machine of the class described, the combination of carton forming mechanism, coin counting mechanism, power means for driving both of said mechanisms, said mechanisms being adapted to operate under manual control in a predetermined sequence for forming the cartons and filling them with coins, means for manually transferring the power drive from the forming to the counting mechanism, and means for automatically transferring the drive back again to the forming mechanism.

3. In a machine of the class described, carton forming mechanism comprising a mandrel, a pair of forming rolls cooperating with said mandrel for forming the cartons, a rotating crimping head for crimping the ends of the cartons, said crimping head being shiftable into operative engagement with the ends of the cartons, means for rotating said forming rolls with said crimping head, means actuated by the shifting of said crimping head for interrupting the driving connection to said forming rolls, said mandrel being removable whereby a coin filled carton can be positioned for crimping by said crimping head, carton filling means adjacent said forming means for filling a carton formed on said mandrel, and automatic means for indicating to the operator when said carton is filled by stopping said filling means and starting said forming means ready for use to form the open end of the filled carton.

4. In a machine of the class described, the combination of carton forming mechanism, coin counting mechanism, power means for driving both of said mechanisms, said mechanisms being adapted to operate under manual control in a predetermined sequence for forming the cartons and filling them with coins, means for manually transferring the power drive from the forming to the counting mechanism and means for automatically stopping counting mechanism and transferring the drive back again to the forming mechanism.

5. In a machine of the class described, carton forming mechanism comprising a mandrel, a forming roll cooperating with said mandrel for forming the cartons, a crimping member for crimping the cartons, said crimping member and said mandrel having relative shifting motion, means for normally rotating said forming roll, means controlled by the relative position of said crimping member and said mandrel for interrupting the rotation of said forming roll, said mandrel being removable to permit substitution of a coin filled carton with one open end therefor, and carton filling mechanism adjacent said carton forming mechanism.

6. In a machine of the class described, carton forming mechanism comprising a mandrel, a forming roll cooperating with said mandrel, for forming the cartons, a crimping member for crimping the cartons, said crimping member and said mandrel having relative shifting motion, means for normally rotating said forming roll, means controlled by the relative position of said crimping member and said mandrel for interrupting the rotation of said forming roll, a manual control lever for producing said relative shifting motion, and coin counting and carton filling mechanism at the control lever end of said forming mechanism.

7. In a machine of the class described, carton forming mechanism comprising a mandrel, a forming roll cooperating with said mandrel, for forming the cartons, a crimping member for crimping the cartons, said crimping member and said mandrel having relative shifting motion, means for normally rotating said forming roll, means controlled by the relative position of said crimping member and said mandrel for interrupting the rotation of said forming roll, a manual control for producing said relative shifting motion, coin counting and carton filling mechanism at the control lever end of said forming mechanism, a power drive, manual means for transferring the power drive from the forming mechanism to the counting mechanism to fill a partially formed carton, and automatic means for stopping said counting mechanism and transferring the drive back to said forming mechanism when the carton is filled.

8. In a machine of the class described, carton forming mechanism comprising a mandrel, a forming roll cooperating with said mandrel, for forming the cartons, a crimping member for crimping the cartons, said crimping member and said mandrel having relative shifting motion, means for normally rotating said forming roll, means controlled by the relative position of said crimping member and said mandrel for interrupting the rotation of said forming roll, a manual control for producing said relative shifting motion, coin counting and carton filling mechanism at the control lever end of said forming mechanism, a power drive, manual means for transferring the power drive from the forming mechanism to the counting mechanism to fill a partially formed carton, and automatic means for stopping said counting mechanism and transferring the drive back to said forming mechanism when the carton is filled, said mandrel being removable to permit forming the open end of said filled carton with the same crimping member.

9. In a machine of the class described, carton forming and sealing mechanism, coin counting and carton filling mechanism placed beside said forming mechanism, and an independent manual control lever for said forming mechanism, a manual control lever for said counting mechanism to start operation of its own mechanism.

10. In a machine of the class described, coin counting and carton filling mechanism, carton forming and sealing mechanism beside said counting mechanism for forming a carton before it is filled and sealing it after it is filled, a manual control lever for said forming mechanism, movable away from said counting mechanism to form or seal a carton and in the opposite direction preparatory to the next operation in the sequence.

11. In a machine of the class described, coin counting and carton filling mechanism, carton forming and sealing mechanism beside said counting mechanism for forming a carton before it is filled and sealing it after it is filled, a manual control lever for said forming mechanism, movable away from said counting mechanism to form or seal a carton and in the opposite direction preparatory to the next operation in the sequence, and a manual control lever for starting said counting mechanism movable away from said forming mechanism to start its own mechanism.

12. In a machine of the class described, coin counting and carton filling mechanism, carton forming and sealing mechanism beside said counting mechanism for forming a carton before it is filled and sealing it after it is filled, a manual control lever for said forming mechanism, movable away from said counting mechanism to form or seal a carton and in the opposite direction preparatory to the next operation in the sequence, a manual control lever for starting said counting mechanism movable away from said forming mechanism to start its own mechanism, and automatic means for stopping said counting mechanism and throwing the manual lever therefor back to initial position.

13. In a machine of the class described, coin counting and carton filling mechanism, carton forming and sealing mechanism beside said counting mechanism for forming a carton before it is filled and sealing it after it is filled, a manual control lever for said forming mechanism, movable away from said counting mechanism to form or seal a carton and in the opposite direction preparatory to the next operation in the sequence, a manual control lever for starting said counting mechanism movable away from said forming mechanism to start its own mechanism, automatic means for stopping said counting mechanism and throwing the manual lever therefor back to initial position, a source of power for driving either mechanism, and a connection for automatically delivering power to one or the other of said mechanisms in accordance with the position of the control lever for said counting mechanism.

14. In a machine of the class described, power driven carton forming and sealing mechanism, power driven coin counting and carton filling mechanism, a manual control lever for operating said forming mechanism, a control lever operable manually to start said filling mechanism and automatically to stop it, and automatic means for delivering power to one or the other mechanism in accord with the position of said last mentioned control lever.

15. In a machine of the class described, the combination of packeting mechanism, a movable member for feeding coins, a rotatable coin testing member past which the coins are moved, a tripping wheel, a tripping member co-operating with said wheel, means for advancing said tripping wheel in accordance with the engagement of said rotatable contact member with the coins, means carried by said tripping wheel for engaging said tripping member, and means controlled by said tripping member for controlling the operation of said packeting mechanism.

16. In a machine of the class described, the combination of packeting mechanism, coin counting mechanism, common driving means for driving both of said mechanisms, said coin counting mechanism comprising a movable member for carrying coins, a rotatable coin testing member past which the coins are moved, a tripping wheel, means actuated by said coin testing member for intermittently advancing said tripping wheel, a pivoted tripping arm, pins carried by said tripping wheel for engaging said arm, and means actuated by the motion of said arm for controlling the drive from said common driving means to said packeting and coin counting mechanism.

17. In combination, coin packeting mechanism, coin counting mechanism for counting predetermined quantities of coins comprising a movable member for feeding coins, a coin testing member past which the coins are fed, a rotatable tripping member adapted to be advanced with the actuation of said coin testing member, a movable tripping member, means actuated by said latter tripping member for stopping the operation of said coin counting mechanism and starting said coin packeting mechanism, means on said rotating tripping member corresponding to different quantities of coins, and adjusting means for relatively adjusting said rotating tripping member and said movable tripping member for placing the latter in range of said last named means.

18. In combination, a coin packeting machine, a coin counting machine for counting predetermined quantities of coins, said coin counting machine comprising a movable feeding member for feeding the coins, a coin testing member past which the coins are fed, a wheel adapted to be intermittently advanced by the actuation of said coin testing member, a movable tripping member, means actuated by said tripping member for stopping the operation of said coin counting machine and starting the operation of said coin packeting machine, a plurality of tripping devices carried by said wheel, each of said tripping devices corresponding to different numbers of coins, and means for relatively shifting said movable tripping member and said wheel for bringing said movable tripping member into operative association with either of said tripping devices.

19. In combination, a coin packeting machine, a coin counting machine for counting predetermined quantities of coins, common driving means for driving both of said machines, said coin counting machine comprising a movable feeding member for feeding coins, a coin testing member past which the coins are fed, a rotating wheel, means for intermittently advancing said rotating wheel in accordance with the actuation of said coin testing member, a movable tripping arm, a plurality of independent series of tripping pins, carried by said wheel, each of said series corresponding to different multiples of coins, means for shifting said tripping arm into range with either of said series of pins, and means actuated by said tripping arm for controlling said common driving means.

20. In combination, a coin packeting machine, a coin counting machine for counting predetermined quantities of coins, clutch mechanism for controlling the sequence of operation of both of said machines, said coin counting machine comprising a rotatable coin conveying member for feeding the coins, a rotatable coin testing member past which the coins are fed, a shaft actuated by said coin testing member, a wheel, Geneva gears connecting said wheel with said shaft, a pivoted tripping arm, a plurality of independent series of tripping pins having different radial spacings on said wheel, each said series of pins corresponding to different multiples of coins, means for shifting said tripping arm across the face of said wheel for co-operation with either of said series, and means actuated by said pivoted tripping arm for controlling said clutch mechanism.

21. In a coin counting and packeting machine, the combination of coin counting mechanism, packeting mechanism, power transmission mechanism for selectively transmitting a driving force to each of said mechanisms, said coin counting mechanism comprising a counting member, means for moving the coins into operative association with said counting member, tripping mechanism arranged to be advanced each time said counting member cooperates with a coin and means controlled by said tripping mechanism for changing said power transmission mechanism to change the driving relation between said packeting mechanism and said coin counting mechanism.

22. In a machine of the class described, the combination of packeting mechanism, coin counting mechanism, separate shafts for driving each of said mechanisms, clutch mechanism for applying power to each of said shafts, said packeting mechanism comprising a mandrel, a crimping member for crimping the cartons formed on said mandrel, said mandrel and said crimping member being adapted to have relative translational motion, the shaft for driving said packeting mechanism producing relative rotational motion between said mandrel and said crimping member, said coin counting mechanism comprising a counting member, means for feeding the coins into operative association with said counting member, tripping means advanced by the operation of said counting member, and means controlled by said tripping means for actuating said clutch mechanism.

23. In combination, coin packeting mechanism, coin counting mechanism, driving means for driving both of said mechanisms, clutch means in said driving means for controlling the drive to said mechanisms, means in said coin counting mechanism connecting with said clutch means for controlling said clutch means and thereby the drive to said mechanisms in accordance with the counting of the coins, and a manually releasable clutch for releasing one of said mechanisms independently of the operation of said first clutch means.

24. The method of packeting coins with a carton forming machine and a counting machine which comprises, forming one end of the carton in the carton forming machine, transferring the carton to the counting machine, filling the carton, transferring it to the same carton forming machine, and sealing the open end of the carton.

25. The method of packeting coins with carton forming mechanism, and counting mechanism which comprises, manually operating the forming mechanism to form one end of the carton, manually transferring the carton to the counting mechanism, manually starting the counting mechanism, automatically filling the carton with counted coins, automatically stopping the counting mechanism and starting the forming mechanism, manually transferring the filled carton to the forming mechanism, and forming the remaining end of the carton.

26. In combination, carton forming mechanism adapted to form cartons and to seal them when filled, coin counting and delivering mechanism adapted to hold and to fill a carton, driving means, manual means for connecting said driving means to said counting mechanism, and automatic means for stopping said counting mechanism when it has filled a carton and for connecting said driving means to said carton forming mechanism.

In witness whereof I have hereunto signed my name this 27th day of May 1920.

CHARLES LAURENCE BURDICK.

Certificate of Correction.

It is hereby certified that in Letters Patent No. 1,484,870, granted February 26, 1924, upon the application of Charles Laurence Burdick, of London, England, for an improvement in "Coin Counting and Packeting Machines," errors appear in the printed specification requiring correction as follows: Page 2, line 17, for the word "if" read *it;* page 10, after line 110 insert the words *The operation of the counting mechanism is as follows:;* page 13, lines 26 and 27, claim 9, strike out the words "and an independent" and insert instead the article *a;* same page and claim, line 28, strike out the article "a" and insert instead the words *and an independent;* and that the said Letters Patent should be read with these corrections therein that the same may conform to the record of the case in the Patent Office.

Signed and sealed this 5th day of August, A. D. 1924.

[SEAL.]

WM. A. KINNAN,
*Acting Commissioner of Patents.*